March 6, 1962 C. C. LASH 3,024,442
RECORDING AND DISPLAY OF SEISMIC DATA
Filed Dec. 18, 1957 4 Sheets-Sheet 1

INVENTOR:
CHARLES C. LASH
BY Newell Pottorf
ATTORNEY

March 6, 1962 C. C. LASH 3,024,442
RECORDING AND DISPLAY OF SEISMIC DATA
Filed Dec. 18, 1957 4 Sheets-Sheet 2

INVENTOR:
CHARLES C. LASH
BY
ATTORNEY

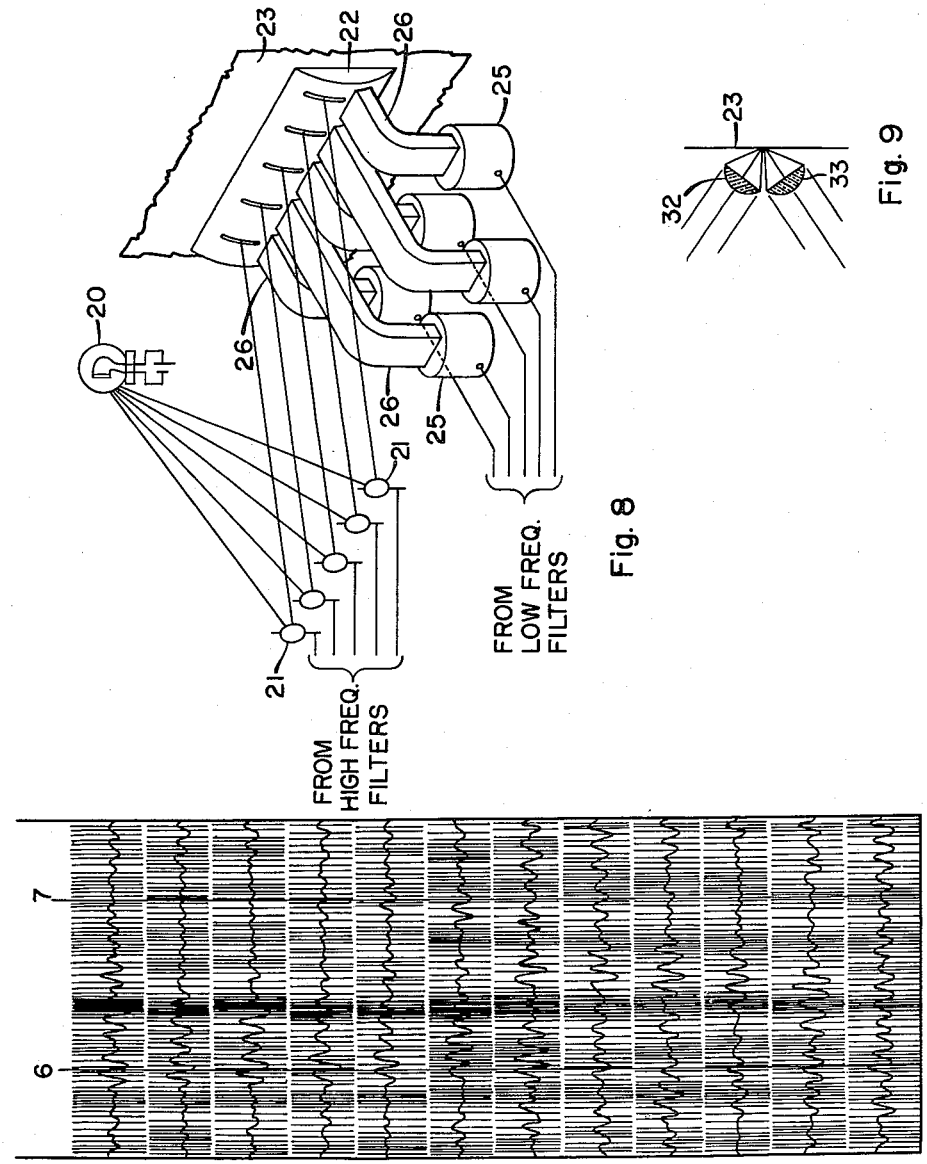

March 6, 1962 C. C. LASH 3,024,442
RECORDING AND DISPLAY OF SEISMIC DATA
Filed Dec. 18, 1957 4 Sheets-Sheet 4

INVENTOR:
CHARLES C. LASH
BY
ATTORNEY

United States Patent Office 3,024,442
Patented Mar. 6, 1962

3,024,442
RECORDING AND DISPLAY OF SEISMIC DATA
Charles C. Lash, Tulsa, Okla., assignor to Pan American Petroleum Corporation, Tulsa, Okla., a corporation of Delaware
Filed Dec. 18, 1957, Ser. No. 703,535
8 Claims. (Cl. 340—15)

This invention relates to seismic geophysical surveying and is directed to the recording and display of seismic data. More specifically, it is directed to a novel method and apparatus for displaying seismic data simultaneously in two or more non-conflicting forms which together convey greater information than either form alone, while preserving the full details of both forms.

It is well known that it is desirable to present seismic data in the form of record cross-sections of any of several kinds such as variable-intensity, variable-area, line-deflection traces, and the like. Such records or cross-sections, however, are ordinarily made using a filter, either for discriminating against noise or for emphasizing signals lying within a certain frequency band relative to other signals. When noise is not a problem, this filtering amounts to discarding part of the useful signal information. It is justifiable, however, for the reason that the presence of too many overlapping signals may make the record difficult to interpret. By choosing to look at only part of the signals at a time the interpretation of the recordings may be aided.

From the impulsive nature of the seismic source ordinarily used, it can be predicted that the seismic reflections from geologic boundaries should usually be relatively short impulses. These will generally be of relatively small amplitude but high in frequency. On the other hand, strong seismic signals are often set up by the seismic reflection properties of several critically spaced geological boundaries in a depth interval. The frequencies of these signals will generally be relatively low, and they may be of relatively large amplitude. To a first approximation this means that high-frequency filtering of seismic signals emphasizes boundaries and small details, while low-frequency filtering emphasizes the over-all trends of a group of geologic beds more or less forming a unit as regards strong seismic reflections.

It is a primary object of my invention to provide a novel method and apparatus for taking maximum advantage of two or more types of filtering of seismic data by displaying the resultant wave forms on a single record surface without mutual interference. A more specific object is to provide such a method and apparatus for recording seismic records or cross-sections with both long- and short-period reflections, for showing both geological trends and details in a form such that each appears clearly without obscuring the other. Each therefore aids in interpreting or understanding the other. Other and further objects, uses, and advantages of the invention will become apparent as the description proceeds.

Stated briefly, the foregoing objects are accomplished by a novel method and apparatus wherein the outputs of two or more filters are simultaneously recorded in superposition in a non-conflicting manner. Specifically, the low-frequency waves are generally considered indicative of a group of alternating reflecting interfaces and are thus to be associated with the over-all geological trends, are recorded as variable-density traces in a plurality of parallel bands along the length of a record, or the vertical extent of a cross-section, while the high-frequency waves indicative of the specific interfaces and thin strata forming the geologic section of interest are shown as line-deflection traces on top of the variable-density bands. By limiting the range of variation of density of the variable-density traces, and preferably by showing the low-frequency wave forms as alternate values of gray and white, or transparency, the form of each corresponding line-deflection trace can be easily followed. There is thus produced a single display of both high- and low-frequency data, each of which kinds of data is independently readable as desired; but both together are far more useful than either one separately because the difficulty of accurately comparing two sets of data appearing on two different sheets of paper is avoided. As with ordinary variable-density recording, the geologic trends are shown by the low-frequency line-ups extending from variable-density trace to trace across the record or section, while the details of the stratification are simultaneously visible on the line-deflection traces, which, because of the usual smaller amplitude of the high-frequency waves, tend to stay within the outlines of each corresponding variable-density band.

This will be better understood by reference to the accompanying drawings forming a part of this application, in which drawings, FIGURE 1 is a tracing of a portion of a seismic field record recorded with a substantially flat filter response;

FIGURE 7 is a composite record similar to FIGURE 5 made in accordance with an alternative embodiment of the invention and showing the superposition of the line-deflection traces of FIGURE 3 on the continuously variable-density portion of FIGURE 6;

FIGURE 8 is a diagrammatic representation of one embodiment of an apparatus for recording traces in accordance with the invention;

FIGURE 9 is a diagrammatic representation of an alternative form of apparatus for recording in accordance with the present invention.

Figure 1:
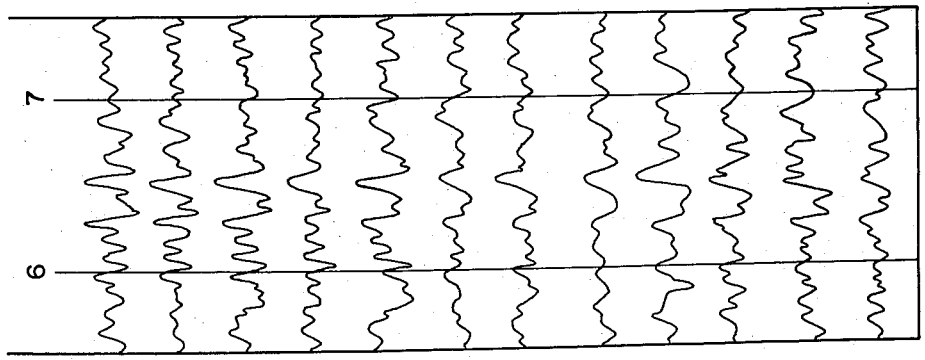

Referring now to the drawings in detail and particularly to FIGURE 1, this figure shows the twelve traces of a seismic field record which has been recorded by a system with substantially flat frequency response. This ordinarily means that the filtering which has been done is a minimum, although the effect of some filtering may be present in that the system does not respond to either the very highest or very lowest frequencies. Whether such cut-off of extreme frequencies is performed by the system itself or with the aid of a very broad band-pass filter is immaterial. It will be evident from an inspection of the traces of FIGURE 1 that a great amount of detail is present in each trace—so much so that correlation of the details from trace to trace across the record is rendered in places somewhat difficult.

It should be understood further that FIGURE 1 is what may be termed an isopach presentation in which the traces have been shifted relative to each other by various amounts to align a reflection appearing at a record time of about .602 second. This, of course, removes all of the ordinary time differences between corresponding events on the various traces due to weathering and elevation differences at the various seismometer positions and due to normal move-out. The last is the effect of having the various seismometers at different distances from the shot point.

Time differences due to dipping of the reference bed or interface also disappear, leaving only those due to the relative dip of other reflecting interfaces with respect to the reference. While such trace shifting makes more obvious the alignment of events in this example, it forms no part of this invention, which is applicable to the recording of any traces whether shifted in time or not.

Figure 2:
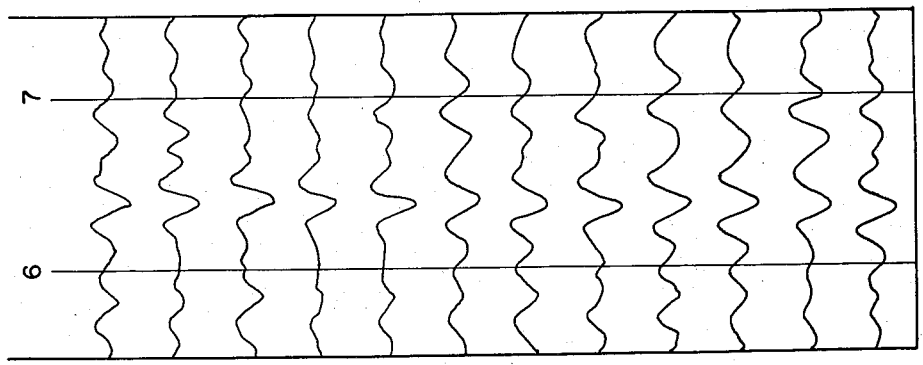

In FIGURE 2 are shown the traces which result from passing the signals recorded in FIGURE 1 through a low-frequency band-pass filter. By thus averaging together a number of the high frequency events that appear in the record of FIGURE 1, a smaller number of low-frequency reflections or general trends become apparent. Especially is this true at around a record time of .64 second where a particular sequence of high-frequency reflections of alternating phase has produced a prominent low-frequency reflection line-up. Such an indication of a line-up or general trend is present in FIGURE 1, but it appears considerably less obvious there than in FIGURE 2.

Figure 3:
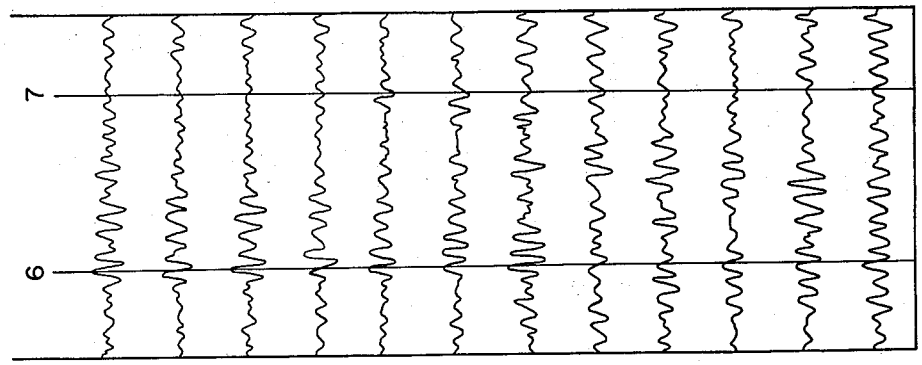
FIGURES 2 and 3 are the records which result from filtering the record of FIGURE 1 respectively by low and high frequency filters.

FIGURE 3 is analogous to FIGURE 2 except that it represents the data of FIGURE 1 as filtered by a high-frequency band-pass filter. In this case, the high-frequency wave forms are substantially emphasized compared to their appearance in FIGURE 1. By dropping out the low-frequency information contained in FIGURE 2, the detailed correlation of the high-frequency features from trace to trace is made much easier to follow. From the wealth of details present in FIGURE 3, however, it is not immediately obvious how the beds would group themselves into different sequences, each indicating a general trend such as is shown by the low-frequency filtering of FIGURE 2.

Figure 4:
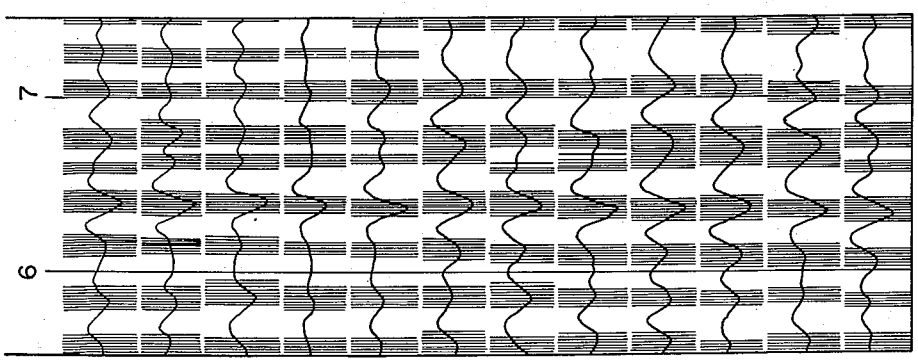
FIGURE 4 is a composite record showing the record of FIGURE 2 and its translation into a form of variable density consisting of two shades.

FIGURE 4 is presented to show how the low-frequency record of FIGURE 2 is translated into a variable-density record of two alternating densities. Thus, for example, the positive parts of the low-frequency wave forms are represented as white or transparent spaces, while the negative portions of the wave form are gray or of medium transparency. By making the variable-density track almost as wide as the normal spacing between the line-deflection traces, it is obvious how the alternating light and dark portions tend to merge into continuous bands running transversely across the record or cross-section. It is these bands which in variable-intensity recording tend to suggest pictorially the thickness and shapes of the subsurface strata.

The records shown in FIGURES 1, 2, 3, and 4 are not ordinarily produced in making records in accordance with the present invention. The record which is made in accordance with the invention is that of FIGURE 5. As will be apparent from the foregoing discussion, this record corresponds to the high-frequency filtered record of FIGURE 3 superimposed on the variable-intensity portion of the low-frequency record of FIGURE 4. Thus, it will be apparent that on the record of FIGURE 5 not only are shown the high-frequency details of FIGURE 3, but also the low-frequency trends of FIGURE 4. Furthermore, the exact time relationships between the high-frequency events and the low-frequency trends are immediately obvious. That is, the high-frequency events may be easily correlated from trace to trace of the galvanometer deflection traces and may be easily read throughout the gray portions of the variable-density presentation. The latter, of course, show the general trends of the subsurface data in the same way as the line-deflection traces of FIGURE 2, so that the presentation of FIGURE 5 thus contains both the high-frequency and low-frequency data present in the record of FIGURE 1 but presented in a manner so that each is independently observable without conflicting with the other.

Figure 6:
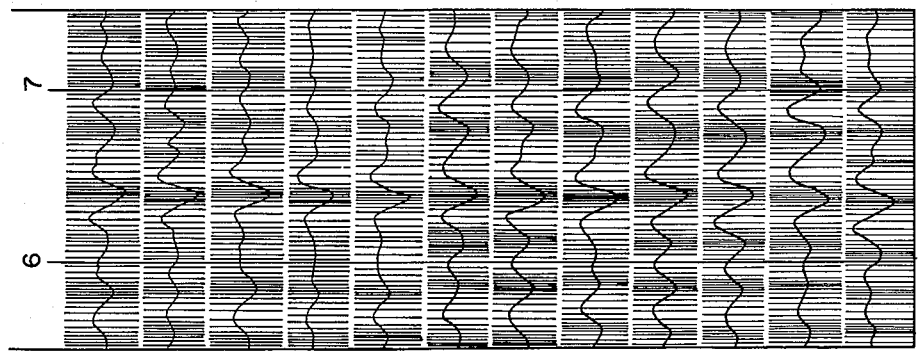
FIGURE 6 is a record similar to FIGURE 4 showing the representation of the low-frequency filter output as a continuously varying density of limited range.
Figure 5:
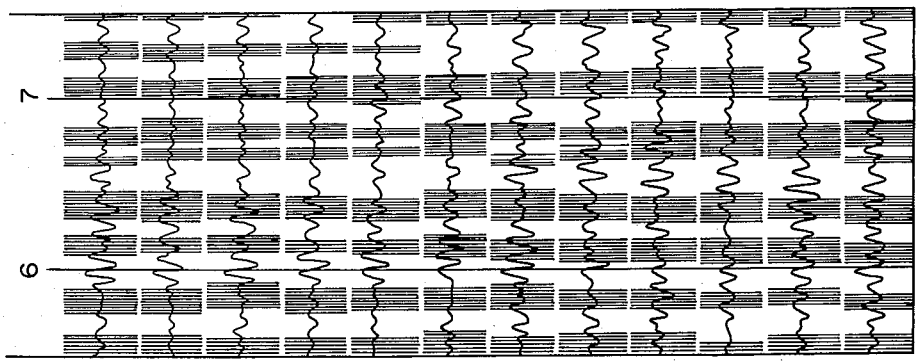
FIGURE 5 is a composite record made according to one embodiment of the invention, showing the result of superimposing the high-frequency galvanometer deflection traces of FIGURE 3 and the variable-density portion of FIGURE 4.

While the record of FIGURE 5 shows the same trends as the low-frequency record of FIGURE 2, it does not make clear the fact that the event at a time of about .64 second is relatively more prominent than any other on the low-frequency record. This further information can be shown by translating the low-frequency filter output into a modified continuously variable-density record as shown in FIGURE 6. This is a variable-density record of the usual form except that the gray scale has preferably been shifted toward the white or transparent end. That is to say, if the maximum peak amplitude of the wave form is represented by white, the maximum trough amplitude is represented, not by black, but by a gray or medium density. Thus, as appears in FIGURE 6, the most prominent trough is shown as the darkest gray, while the other troughs are shown as lesser densities.

This results in a final record appearance as shown in FIGURE 7 where the major low-frequency event at a time of about .64 second is the most prominent variable-density line-up on the record, while the other low-frequency line-ups are less marked. The high-frequency galvanometer line-deflection traces in this figure are the same as in FIGURES 3 and 5.

In FIGURE 8 is shown in diagrammatic form a portion of an apparatus suitable for recording in accordance with the present invention. Thus, light from a light source 20 falls on the mirrors 21 of a plurality of ordinary mirror galvanometers of the type conventionally used in seismic recording. The deflected light beams from mirrors 21 travel to a cylindrical condensing lens 22 which focuses the beams into intense light spots on the surface of the photographic recording paper or film 23. The deflections of the various beams by the galvanometers produce the line-deflection traces for the high-frequency filter output in the ordinary manner well known in seismic recording.

At the same time, the output of each low-frequency filter corresponding to a trace to be recorded is applied to one of a plurality of variable-intensity light sources 25 equipped with a light pipe 26 of suitable material, such as a transparent acrylic resin of the type known commercially as "Lucite," the light from the end of each pipe 26 passing through condensing lens 22 in the position occupied by the corresponding galvanometer trace. Lens 22 thus focuses on the paper 23 both the intense light from each of beam-forming galvanometers 21 and the diffused varying-intensity light from each variable-intensity source 25. Thus, the two types of record trace are simultaneously produced in superimposed form.

A modification of this arrangement is shown in FIGURE 9 wherein the variable-deflection trace beams from the galvanometer mirrors 21 are focused on the film 23 by one cylindrical lens 32, while the variable-intensity light beams are transmitted to the film 23 by a separate cylindrical lens 33. By tilting the axes of the lenses at a proper angle, both the variable-intensity and variable galvanometer-deflection beams can be brought to the same focal point on the film 23. This embodiment offers the further possibility, however, that, if it is desired to correct for time differences due to different delay times of the high and low-frequency filters, it is necessary only to focus the lenses 32 and 33 to appropriately different places along the film 23. In this way the delay times may be compensated or, if desired for any reason, specific time delays between the recording of the two filter outputs can be introduced.

Figure 10:
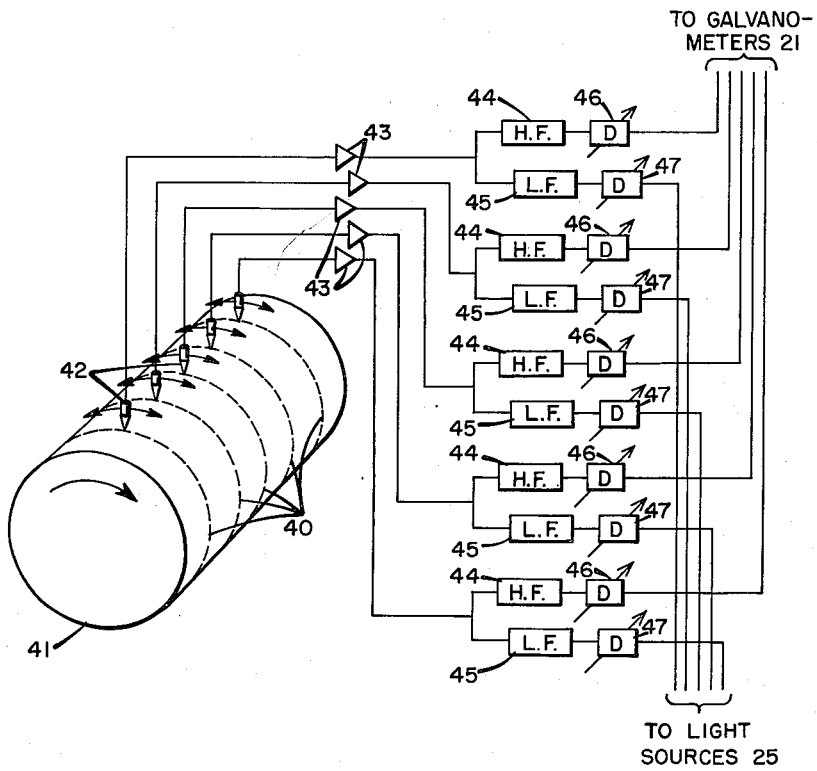
FIGURE 10 is a diagrammatic representation of the portions of a conventional recording system which cooperate with the apparatus of FIGURE 8.

The remaining portions of the recording system can be entirely conventional, such as are shown in FIGURE 10. Thus, the signal sources may be tracks 40 recorded on a rotatable magnetic drum 41. Each track is electrically reproduced by a corresponding pickup head 42, connected to an amplifier 43, the output of which is applied in parallel to two different filters 44 and 45. In series with filters 44 and 45, respectively, are adjustable delay units 46 and 47 by which any relative time shifting of the filter outputs can be provided over the relative trace shifting available by moving the heads 42, or as is provided in accordance with FIGURE 9.

While the invention has been described with reference to the foregoing specific embodiments and details, it is to be understood that other and further modifications will occur to those skilled in the art. For example, a system somewhat intermediate between those described can be readily devised which can employ a discrete number of shades of gray rather than merely the two shades of FIGURE 5 or the continuous shading of FIGURE 7. The small-amplitude wave forms would accordingly be shown as involving only one or two shades while the larger wave forms would involve several more.

For other reasons also, it might be desired to reverse the presentation suggested herein in that the low-frequency filter output could be shown as a galvanometer line-deflection trace and the high-frequency details could be shown as variable-intensity bands superimposed on the galvanometer deflection trace. For display purposes, however, it is deemed that the presentations of FIGURES 5 and 7 as described herein are to be preferred.

As to the two types of filtering which are performed in accordance with the invention, instead of using two substantially different frequency bands, the two filters may be different chiefly as to band width, with the narrower-band filter falling entirely or partially within the broad-band filter response. In this modification the narrow-band filter output would be recorded as the variable-density trace, while the broad-band filter output would be shown as the superimposed line-deflection trace.

The scope of the invention therefore is not to be considered as limited to such details as have been described but it is preferably to be ascertained from the appended claims.

I claim:

1. A recording system for the visual presentation of seismic waves received at a plurality of locations spaced from a shot point after transmission through the earth from said shot point, said system comprising a plurality of means each for producing electric waves corresponding to the seismic waves received at one of said locations, a pair of filters connected to the output of each of said electric wave-producing means, one of said filters transmitting a substantially higher range of frequencies than the other, means connected to the output of one of said pair of filters for recording its output as a variable-density trace of substantially constant width on an elongated record-receiving medium, and means connected to the output of the other of said pair of filters for recording its output as a variable-deflection linear trace substantially centered and superimposed upon said variable-density trace.

2. A system as in claim 1 including also means for delaying the recording of the outputs of different ones of said filters by amounts sufficient to equalize different wave travel times to different ones of said locations and different transmission times through the different filters of said pair of filters.

3. A system as in claim 2 in which said variable-deflection linear trace-recording means is connected to the higher-frequency-transmitting filter of said pair of filters and the variable-density trace-recording means is connected to the lower-frequency-transmitting filter of said pair of filters.

4. A recording system for the visual presentation of both trends and details of seismic data which comprises means for producing a plurality of voltages each corresponding to the substantially unfiltered seismic waves to be recorded as a record trace, means for shifting the times of occurrence of events in the various traces to obtain alignment with a reference trace at at least one record time, the plurality of pairs of filters each consisting of one low-frequency and one high-frequency band-pass filter and there being one pair of filters for each trace to be recorded, a variable-density recording element connected to record the output of each low-frequency filter, a deflection galvanometer recording element connected to record the output of each high-frequency filter, and means for moving a record-receiving medium through the recording beams of said recording elements, the zero position of each said galvanometer recording element being adjusted to fall approximately in the center of the trace produced by the corresponding variable-density recording element.

5. In a multiple-trace recording system for the visual presentation of seismic waves wherein each trace-recording channel includes at least two substantially different filters connected in parallel, one of said filters emphasizing relatively low frequencies and another of said filters emphasizing realtively high frequencies, the improvement which comprises means connected to the low-frequency one of said filters for recording its output as a variable-density trace having densities varying between gray and white, and means connected to the relatively high-frequency one of said filters for recording its output as a line-deflection trace centered on the corresponding variable-density trace.

6. The improvement as in claim 5 wherein said variable-density trace-recording means is adapted to record said low-frequency-filtered waves as a trace having a discrete number of shades between gray and white.

7. The improvement as in claim 5 wherein said variable-density trace-recording means is adapted to record positive and negative values of said low-frequency-filtered waves as the one and the other, respectively, of the two shades gray and white.

8. In a system for visual-display recording of seismic waves including a visible-record-receiving surface, means for amplifying the waves to be recorded as each trace of a multiple-trace record, and a pair of filters connected to each said amplifying means, one of said filters passing substantially lower frequencies than the other of said pair of filters, the improvement comprising a variable-density recording element connected to record on said surface the output of the lower-frequency filter of said pair, and a line galvanometer recording element connected to record, in the center of the trace produced by said variable-density element, the output of the highest-frequency filter of said pair.

References Cited in the file of this patent

UNITED STATES PATENTS

| | | |
|---|---|---|
| 1,777,037 | De Forest | Sept. 30, 1930 |
| 1,901,033 | Karolus | Mar. 14, 1933 |
| 2,206,963 | Kellogg | July 9, 1940 |
| 2,440,971 | Palmer | May 4, 1948 |
| 2,527,463 | Sziklai | Oct. 24, 1950 |
| 2,540,105 | Dunbar | Feb. 6, 1951 |
| 2,558,863 | McCarty | July 3, 1951 |
| 2,750,575 | Doty | June 12, 1956 |